United States Patent

Kruse et al.

[11] Patent Number: 5,913,936
[45] Date of Patent: Jun. 22, 1999

[54] PLURAL CONE SYNCHRONIZER FOR RANGE SHIFT TRANSMISSION

[75] Inventors: Randy P. Kruse, Southern Pines; Kenneth T. Picone, Pinehurst; Jonathan S. Rose, Laurinburg, all of N.C.

[73] Assignee: Meritor Heavy Vehicle Systems, L L C, Troy, Mich.

[21] Appl. No.: 08/918,997

[22] Filed: Aug. 27, 1997

[51] Int. Cl.⁶ .................................................. F16H 3/38
[52] U.S. Cl. ............................ 74/339; 192/53.32
[58] Field of Search ...................... 74/339; 192/53.32, 192/53.331

[56] References Cited

U.S. PATENT DOCUMENTS

| | | | |
|---|---|---|---|
| 3,272,291 | 9/1966 | Flinn | 192/53.32 |
| 3,286,801 | 11/1966 | Wojcikiwoski | 192/53.331 |
| 4,125,179 | 11/1978 | Cochran et al. | 192/53 E |
| 4,462,489 | 7/1984 | Morscheck | 192/53 E |
| 5,638,930 | 6/1997 | Parsons | 192/53.32 |
| 5,678,670 | 10/1997 | Olsson | 192/53.32 |
| 5,799,540 | 9/1998 | Diehl et al. | 74/339 |

FOREIGN PATENT DOCUMENTS

| | | |
|---|---|---|
| 24 70897 | 6/1987 | France . |
| 28 47 303 | 5/1979 | Germany . |
| 2009868 | 5/1979 | United Kingdom . |

OTHER PUBLICATIONS

The Jaguar XJ220 Triple–Cone Synchronizer A Case Study; by Lee M. Sykes of FF Developments.

Manual Transmission Synchronizers; by Richard J. Socin of Chrysler Corporation and L. Kirk Walters of Chevrolet Motor Division of General Motors Corporation.

*Primary Examiner*—Dirk Wright

[57] ABSTRACT

A multispeed transmission includes a range section having a plural cone synchronizer. The plural cone synchronizer is utilized to assist in transmitting the high torque load typically found in low range. The inventive synchronizer includes a unique structure for selectively connecting the outer and inner cones.

18 Claims, 2 Drawing Sheets

PLURAL CONE SYNCHRONIZER FOR RANGE SHIFT TRANSMISSION

BACKGROUND OF THE INVENTION

This invention relates to the use of a plural cone synchronizer to facilitate shifting between high and low ranges in a multispeed transmission.

In the prior art, heavy vehicle transmissions typically consist of two sections. A first main section includes a plurality of selectable gears to provide different speed ratios. A second range section takes an input from the first section and modifies the speed to provide a multiple of additional speeds.

The range section shifts the speeds within the main transmission section between two ranges, namely high and low. Known range sections move a shift collar to connect an input shaft directly to an output shaft, thereby creating a high speed. Alternatively, the collar connects the input to a gear reduction to drive the output shaft to provide the low function.

In the prior art, range sections have typically used single cone synchronizers. Synchronizers include cones with a friction surface that rotate with the gears which are being connected. The synchronizer members engages and begin to drive the two gears towards an equal speed prior to the gears actually being directly engaged.

In the prior art, transmission range sections have typically only used single cone synchronizers. Plural cone synchronizers have been utilized in some limited automobile applications. However, plural cone synchronizers have not been utilized in heavy vehicle applications, generally, and not in the range section in particular.

SUMMARY OF THE INVENTION

In a disclosed embodiment of this invention, a plural cone synchronizer is incorporated into the range section of a heavy vehicle transmission. The range section includes a collar shiftable between high and low positions to connect an input shaft directly to an output shaft for high speed, or alternatively connect the input shaft to the output shaft through a series of gears on a countershaft. In this way, a speed reduction is achieved and low range is provided.

A plural cone synchronizer is preferably only utilized on the low range gears. The high gear is preferably provided with a single cone synchronizer. This provides two functions. First, the low range section typically transmits higher torque, and the use of the plural cones allows the transmission of higher torque more readily. In addition, the more synchronizer cones utilized, the quicker the gears are matched. High range typically is achieved more quickly than the low range. With certain electronic transmission controls, it would be desirable to have a relatively fixed and predictable shift time for the range shift. Thus, it is desirable to have the shifting into either high or low range be achieved with the gears getting up to speed over approximately equal time periods. High range has typically been achieved more quickly than low range. Since the plural synchronizer cones are used on the low range, with only a single cone used on the high range, the low range speed is achieved more quickly and the two time periods will become closer to being equal.

In further features of this invention, the plural cone synchronizer is a triple cone synchronizer. Preferably, a middle cone is splined to an inner periphery of a gear mounted on the output shaft. The shift collar selectively engages the gear when the transmission is shifting into low range. The middle cone has a friction surface engaging an inner cone. The outer cone has a friction surface selectively engaging the middle cone, and a second friction surface selectively engaging lower gear. The outer cone has teeth extending into openings in the inner cone such that the inner and outer cone rotate together. The inner and outer cone also rotate with the output shaft.

These and other features of the present invention can be best understood from the following specification and drawings, of which the following is a brief description.

DETAILED DESCRIPTION OF A PREFERRED EMBODIMENT

Figure 1:
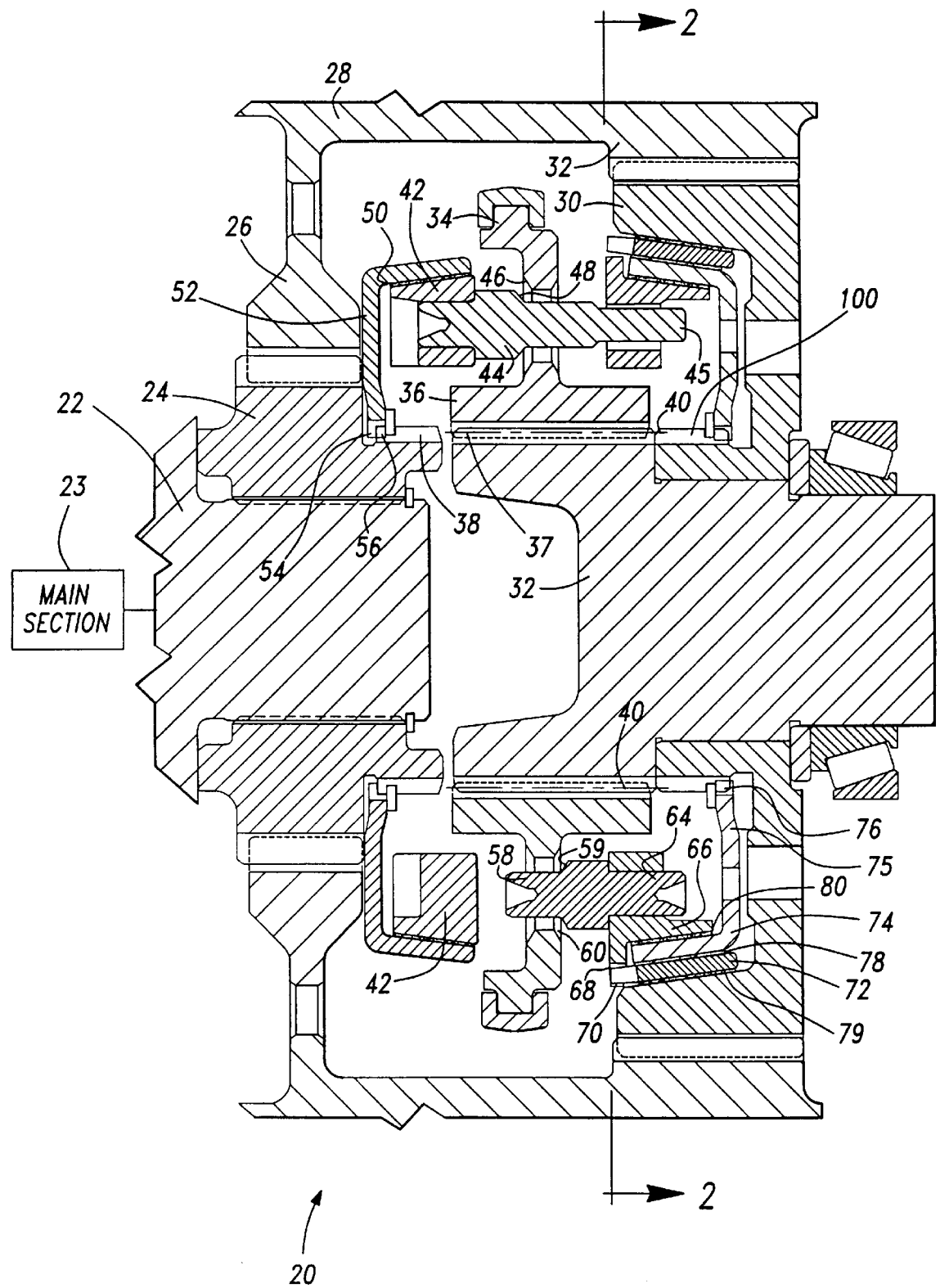
FIG. 1 is a cross-sectional view through a transmission incorporating an inventive range section.

As shown in FIG. 1, range section 20 of a multispeed transmission receives an input shaft 22 from a main transmission section 23. Input shaft 22 drives a gear 24 engaged with a countershaft gear 26. Countershaft gear 26 drives a countershaft 28 which, in turn, drives gear 32. Gear 32 is engaged with a gear 30 mounted on an output shaft 32. The input shaft 22 is selectively connected either directly to output shaft 32 for high range, or through the gears 26, 32 and 30 to the output shaft 32 to achieve a speed reduction and low range. A shift collar 34 achieves the selective connection. Shift collar 34 includes an engagement member 36 having internal teeth 37 which constantly engage teeth 40 on output shaft 32.

The range section is shown in neutral with neither range engaged. In a position where collar 34 is moved to the left from the illustrated position teeth 37 engage teeth 38 on gear 24. Rotation is then transmitted directly from shaft 22 to shaft 32. This position provides high range.

When the transmission shifts to low range, collar 34 moves to the right as shown in FIG. 1 and teeth 37 engage teeth 100 of gear 30. In this position, gear 30 is now driven with output shaft 32. Rotation is transmitted through the countershaft gears and to the output shaft 32. There is, a speed reduction provided by the gears 24, 26, 32 and 30 which results in a lower speed for the output shaft 32. This position provides the low range.

A synchronizer is associated with both the high and low range positions to assist the transmission in beginning to move the gears to the desired speed just prior to engagement. A high range synchronizer cone 42 moves with synchronizer pin 44 when the collar 34 is moved to the left to achieve high range. A chamfered surface 46 engages a chamfered surface 48 on pin 44, and forces cone 42 to the left. A friction surface 50 formed on the inner periphery of cone 52 engages a synchronizer cone 42. Synchronizer cone 52 has splines 54 which engage mating splines 38 on gear 24. When the transmission is shifted to high range, the synchronizer cones 42 and 52 engage before teeth 37 and 38 engage. Thus, the cones begin to move gear 24 and shaft 32 to equal speeds prior to engagement.

A low range synchronizer includes a pin 58 which has a shoulder 59 engaged by a mating shoulder 60 on the collar 34. When the collar 34 is moved to the right, surface 60 engages surface 59 and the pin 58 is moved to the right. A forward surface 64 of pin 58 is received within cone 66. Cone 66 has spaced outer surfaces 68 with intermediate gaps which receive tab 70 from an outer synchronizer cone 72. This structure is better shown in FIG. 2.

A middle synchronizer cone 74 has a radially inwardly extending portion 75 extending to a series of splines 76 received in teeth 100 on the gear 30. Thus, the middle synchronizer cone 74 tends to rotate with the gear 30, and as the collar 34 is shifted to the right, the frictional interaction between cones 66 and 74, 74 and 72 and 72 and gear 30 through the friction surfaces 80, 78 and 79, tend to move the cones 66 and 72 rapidly up to the same speed as the cone 74 and gear 30. Thus, gear 30 tends to quickly reach the same speed as shaft 32. Again, the cones begin to drive the gear to the synchronized speed prior to teeth 37 engaging teeth 100.

The use of the plural cone synchronizer on the low range side ensures that the high inertia transmitted at that speed will be adequately carried. Moreover, as mentioned above, the invention achieves quicker shifting into low range, and more equal shift times between high and low range.

Figure 2:
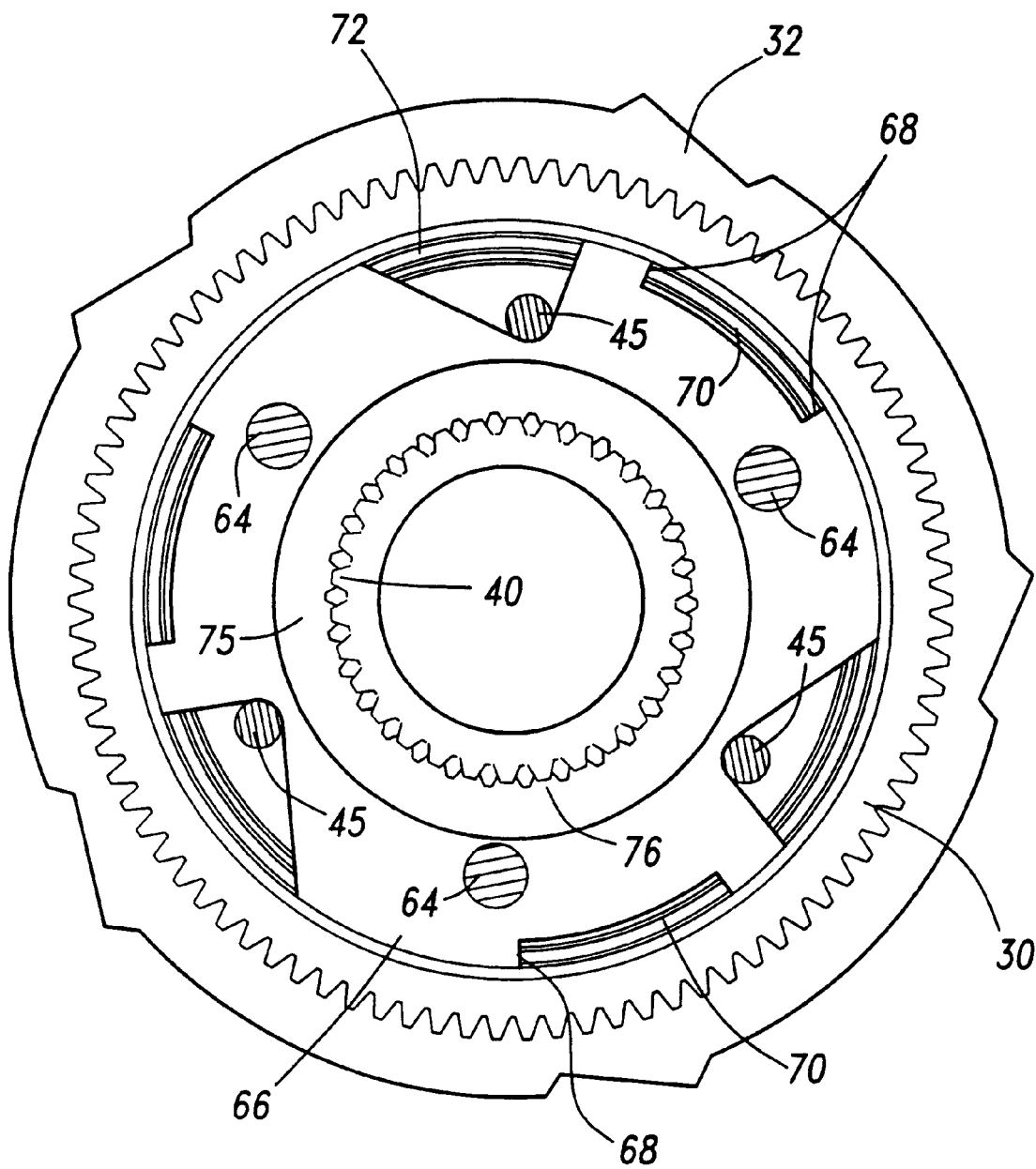
FIG. 2 is a cross-sectional view along line 2—2 as shown in FIG. 1.

As shown in FIG. 2, gear 30 receives the cone 66 at an inner peripheral portion. Pins 64 are received in cone 66. The pins 45 from the high range synchronizer extend through cone 66 but are not secured. Tabs 70 extend between and into gaps between sections 68 of cone 66 to ensure that the outer and inner cones rotate together. The teeth 100 are engaged by the teeth 76 of the middle cone.

A preferred embodiment of this invention has been disclosed, however, a worker of ordinary skill in the art would recognize that certain modifications come within the scope of this invention. For that reason, the following claims should be studied to determine the true scope and content of this invention.

We claim:

1. A multispeed transmission comprising:
   an input shaft;
   a range section driven by said input shaft, said range section being operable to selectively apply a gear reduction to the speed on said input shaft to achieve a low range, and directly connect said input shaft to said output shaft to achieve a high range; and
   a synchronizing structure associated with said range section to facilitate shifting between high and low range, said synchronizing structure having a plurality of cones for at least one of said high and low range, said plurality of cones including inner and outer cones adapted to rotate together, and to rotate with a first member to be synchronized, a middle cone received between said inner and outer cone and adapted to rotate with a second member to be synchronized.

2. A transmission as recited in claim 1, wherein a plural cone synchronizer is provided for shifts to said low range, shifts into said high range synchronized by a single cone synchronizer.

3. A transmission as recited in claim 2, wherein said plural cone synchronizer is a triple cone synchronizer.

4. A transmission as recited in claim 3, wherein said range section includes a collar which is shifted to selectively engage teeth on a gear with said output shaft, said gear rotating relative to said output shaft when said teeth are not engaged.

5. A transmission as recited in claim 4, wherein a middle one of said triple cones having teeth engaged on said teeth on said gear.

6. A multi-speed transmission comprising
   an input shaft;
   a range section driven by said input shaft, said range section being operable to selectively apply a gear reduction to the speed on said input shaft to achieve a low range, and directly connect said input shaft to said output shaft to achieve a high range; and
   a synchronizing structure associated with said range section to facilitate shifting between high and low range, said synchronizing structure having a plurality of cones for at least one of said high and low range;
   a plural cone synchronizer provided for shifts to said low range, shifts into said high range synchronized by a single cone synchronizer; and
   wherein said synchronizer for said low range includes an inner cone, said inner cone having a radially outwardly extending portion, and an outer cone positioned radially outwardly of said inner cone, said inner and outer cones having structure such that they tend to rotate together.

7. A transmission as recited in claim 6, wherein said structure includes one of said inner and outer cones having gaps and the other of said inner and outer cones having tabs extending into said gaps.

8. A transmission as recited in claim 7, wherein said inner cone radially outwardly extending portion has said gaps, and said outer cone has said tabs.

9. A range section for a multispeed transmission comprising:
   a first range gear engaged for rotation with an input shaft, said first range gear engaging a first countershaft gear, said first countershaft gear being mounted on a countershaft, said countershaft mounting a second countershaft gear, said second countershaft gear driving a second range gear, said second range gear being rotatable freely on an output shaft;
   a range shift collar for selectively shifting a toothed member to connect said output shaft to either said first range gear or said second range gear, to achieve high and low range; and
   synchronizers for synchronizing the speed of said output shaft and both said first range gear and said second range gear when said collar moves to engage either of said first range gear and said second range gear, at least one of said synchronizers including a plurality of cones, said plurality of cones including inner and outer cones adapted to rotate together, and to rotate with a first member to be synchronized, a middle cone received between said inner and outer cone and adapted to rotate with a second member to be synchronized.

10. A range section as recited in claim 9, wherein only said second range gear is associated with a synchronizer having a plurality of cones, with said first range gear being associated with a synchronizer having only a single cone.

11. A range section for a multi-speed transmission comprising:
    a first range gear engaged for rotation with an input shaft, said first range gear engaging a first countershaft gear, said first countershaft gear being mounted on a countershaft, said countershaft mounting a second countershaft gear, said second countershaft gear driving a second range gear, said second range gear being rotatable freely on an output shaft;
    a range shift collar for selectively shifting a toothed member to connect said output shaft to either said first range gear or said second range gear, to achieve high and low range, and
    synchronizers for synchronizing the speed of said output shaft and both said first range gear and said second range gear when said collar moves to engage either of said first range gear and said second range gear, at least one of said synchronizers including a plurality of cones; and wherein only said second range gear is associated with a synchronizer having a plurality of cones, with said first range gear being associated with a synchronizer having only a single cone, wherein said synchronizer for said second range gear including an inner cone and an outer cone, said inner and outer cones having structure such that they tend to rotate together.

12. A range section as recited in claim 11, wherein said structure includes one of said inner and outer cones having gaps and the other of said inner and outer cones having tabs extending into said gaps.

13. A range section as recited in claim 12, wherein said inner cone has a radially outwardly extending portion to be aligned with said outer cones, and said radially outward portion having either said gaps or said tabs.

14. A range section as recited in claim 13, wherein said radially outwardly extending portion of said inner cone having said gaps and said outer cone having said tabs.

15. A synchronizer for a transmission comprising:

an inner cone;

a middle cone;

an outer cone; and said inner and outer cones being adapted to rotate together, and both rotating with a first member to be synchronized, said middle cone being adapted to rotate with a second member to be synchronized, said inner and outer cones interacting with said middle cone to synchronize the speeds of the first and second members, and one of said inner and outer cones having a member extending radially to be aligned with the other, said inner and outer cones having structure to ensure said inner and outer cones rotate together, said structure including gaps formed on one of said inner and outer cones and tabs formed on the other extending into said gaps.

16. A synchronizer as recited in claim 15, wherein said inner cone has radially outwardly extending structure extending outwardly to be aligned with said outer cone.

17. A synchronizer as recited in claim 16, wherein said gaps are formed in said radially outwardly extending structure, and said tabs are formed on said outer cone, said tabs extending into said inner cone.

18. A synchronizer as recited in claim 15, wherein said middle cone has a radially inwardly extending structure, said radially inwardly extending structure being connected to said second member.

* * * * *